(12) United States Patent
Radermacher et al.

(10) Patent No.: US 11,368,322 B2
(45) Date of Patent: Jun. 21, 2022

(54) SIMPLE POWER OVER ETHERNET DATA TRANSMISSION PROTOCOL

(71) Applicant: SIGNIFY HOLDING B.V., Eindhoven (NL)

(72) Inventors: Harald Josef Günther Radermacher, Eindhoven (NL); Matthias Wendt, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 16/962,035

(22) PCT Filed: Jan. 14, 2019

(86) PCT No.: PCT/EP2019/050763
§ 371 (c)(1),
(2) Date: Jul. 14, 2020

(87) PCT Pub. No.: WO2019/141616
PCT Pub. Date: Jul. 25, 2019

(65) Prior Publication Data
US 2020/0403814 A1   Dec. 24, 2020

(30) Foreign Application Priority Data

Jan. 16, 2018 (EP) .................................. 18151897

(51) Int. Cl.
*G06F 1/28* (2006.01)
*H04L 12/10* (2006.01)
(Continued)

(52) U.S. Cl.
CPC .............. *H04L 12/10* (2013.01); *G06F 1/28* (2013.01); *H04B 1/06* (2013.01); *H04L 69/323* (2013.01); *H04L 69/324* (2013.01)

(58) Field of Classification Search
CPC ..... G02B 6/12; G06F 1/00; G06F 1/22; G06F 1/26; G06F 1/28; G06F 13/00;
(Continued)

(56) References Cited

U.S. PATENT DOCUMENTS

| RE39,812 E | 9/2007 | Edem et al. |
| 2007/0110360 A1* | 5/2007 | Stanford ................. H04L 12/10 385/14 |

(Continued)

FOREIGN PATENT DOCUMENTS

| EP | 0421471 A1 | 4/1991 |
| EP | 2645621 A1 | 10/2013 |
| WO | 2016184661 A1 | 11/2016 |

OTHER PUBLICATIONS

A. Hedman, et al., "VSCP Specification 1.10.12", Nov. 7, 2014, pp. 1-531.

*Primary Examiner* — Shawkat M Ali

(57) ABSTRACT

The present invention relates to a simple data transmission protocol and a data receiving device (10, 10', 10'', 10''') for a power over Ethernet system (100') using the simple data transmission protocol. The device (10, 10', 10'', 10''') comprises a port and a simple logic unit. The port is configured for receiving power and data transmitted to the device (10, 10', 10'', 10''') via an Ethernet connection (16'). The simple logic unit is configured to decode data encoded in a characteristic of one or more data packets received at the port. The data can be encoded in data packet length, data packet duration, number of data packets in a predetermined interval, and/or sequence of data packets. The simple data transmission protocol can reduce power consumption as in contrast to the Ethernet protocol MAC does not need to be decoded for information transfer. Hence only simple logic functions are required.

13 Claims, 12 Drawing Sheets

(51) Int. Cl.
*H04B 1/06* (2006.01)
*H04L 69/323* (2022.01)
*H04L 69/324* (2022.01)

(58) Field of Classification Search
CPC ......... G06F 13/4282; H04B 1/06; H04B 3/02; H04B 3/548; H04B 10/40; H04B 45/10; H04B 45/20; H04B 47/185; H04L 12/10; H04L 12/12; H04L 12/24; H04L 12/28; H04L 12/64; H04L 12/2838; H04L 29/08; H05B 33/08; H05B 37/00; H05B 37/02; H05B 37/0254; H05B 45/10; H05B 45/20; H05B 47/185
USPC ...... 370/352, 395.52, 401; 375/257; 385/14; 710/34, 106; 713/300, 310, 320
See application file for complete search history.

(56) References Cited

U.S. PATENT DOCUMENTS

| | | | |
|---|---|---|---|
| 2008/0054720 A1* | 3/2008 | Lum | H02J 1/10 307/52 |
| 2009/0158377 A1 | 6/2009 | Diab et al. | |
| 2012/0275526 A1 | 11/2012 | Hughes | |
| 2013/0193873 A1 | 8/2013 | Isaacson et al. | |
| 2014/0129853 A1* | 5/2014 | Diab | H04L 12/413 713/310 |
| 2015/0127957 A1* | 5/2015 | Sethi | G06F 1/26 713/300 |
| 2015/0207317 A1 | 7/2015 | Radermacher et al. | |
| 2015/0355701 A1* | 12/2015 | Huang | G06F 1/266 711/103 |

* cited by examiner

SIMPLE POWER OVER ETHERNET DATA TRANSMISSION PROTOCOL

CROSS-REFERENCE TO PRIOR APPLICATIONS

This application is the U.S. National Phase application under 35 U.S.C. § 371 of International Application No. PCT/EP2019/050763, filed on Jan. 14, 2019, which claims the benefit of European Patent Application No. 18151897.8, filed on Jan. 16, 2018. These applications are hereby incorporated by reference herein.

FIELD OF THE INVENTION

The present invention relates to a data receiving device, a system, a method for communicating, and a computer program. In particular the invention relates to a data receiving device for a power over Ethernet system, a power over Ethernet system, and a method for communicating with a data receiving device in a power over Ethernet system.

BACKGROUND OF THE INVENTION

Power over Ethernet is described in the IEEE 802.3af standard, Power over Ethernet plus is described in the IEEE 802.3at standard, and 4 Pair Power over Ethernet is currently developed in the IEEE Task Force P802.3bt which will lead to the upcoming IEEE 802.3bt standard. Data is communicated via the Ethernet Protocol between devices in power over Ethernet systems. Therefore a microchip in form of an Ethernet controller such as ENC28J60 can be used to establish a communication link between the devices. The microchip ENC28J60 for example is an Ethernet Controller with on board Media Access Control (MAC) and physical layer (PHY) of the Open Systems Interconnection model (OSI model).

US 2015/0207317 A1 discloses an apparatus for controlling data transfer and power supply to load devices via a network connection. The apparatus supplies power to the load devices via a two-wire data communication cable. Therefore the apparatus applies a pulsed powering voltage of predetermined polarity and amplitude for a fraction of time to the two-wire data communication cable. The apparatus further comprises a data transfer part which is adapted to detect on the two-wire data communication cable a temporary drop of a voltage of an amplitude different from the predetermined amplitude in order to receive data.

SUMMARY OF THE INVENTION

It can be seen as an object of the present invention to provide a data receiving device, a power over Ethernet system, a method for communicating, and a computer program which allow reducing power consumption.

In a first aspect of the present invention a data receiving device for a power over Ethernet system is presented. The data receiving device comprises a port and a simple logic unit. The port is configured for receiving power and data transmitted to the data receiving device via an Ethernet connection. The simple logic unit is configured to decode data encoded in a characteristic of one or more data packets received at the port.

Since the data receiving device comprises a simple logic unit that is configured to decode data encoded in a characteristic of one or more data packets it is possible to receive and process data at the data receiving device without the need to be able to fully decode the MAC or higher layers of the OSI model. This allows reducing power consumption and costs as effort in driver software can be reduced and no micro chip (µC) or micro processor (µP) is required for processing data in the data receiving device. Instead the data receiving device only requires a simple logic unit. The simple logic unit can have a PHY. In case that the simple logic unit does not have a PHY the power consumption and cost can be reduced even further.

Power over Ethernet in this text is understood as covering all embodiments of power over Ethernet, e.g., power over Ethernet according to IEEE 802.3af standard, power over Ethernet plus according to IEEE 802.3at standard, 4 pair power over Ethernet according to the upcoming IEEE 802.3bt standard or any other power over Ethernet.

An Ethernet connection can for example be an optical fiber, an electric wire or a twisted pair cable, such as a Cat 3 cable, Cat 4 cable, Cat 5 cable, Cat 5e cable, Cat 6 cable, Cat 6A cable, Cat 7 cable, Cat 7A cable, Cat 8 cable, Cat 8.1 cable, or Cat 8.2 cable. The Ethernet connection can have several pairs of cables, e.g., 2, 3, 4, or more pairs of cables. The cables can be unshielded or shielded, in particular individually, overally or individually and overally shielded. The power and data can be transmitted via the same fiber, wire, or cable of the Ethernet connection or via different fibers, wires, or cables of the Ethernet connection. In case of transmission of power via an optical fiber the power can be transmitted in the form of photons that can be received by a solar cell unit of the data receiving device.

The data receiving device can comprise one or more ports. Each of the ports can comprise one or more pins. A pin can be configured for receiving power, data or power and data. Additionally or alternatively the port can also comprise one or more solar cell units for receiving power in the form of photons. As the ports can receive power and data via the Ethernet connection some of the pins can be supplied with power, while other pins are supplied with data via the Ethernet connection. Alternatively or additionally a pin can also be supplied with power and data via the Ethernet connection.

The characteristic can comprise data packet length, data packet duration, number of data packets in a predetermined time interval, and/or sequence of data packets. Hence the characteristic can comprise data packet length, data packet duration, number of data packets in a predetermined time interval, or sequence of data packets. The characteristic can also comprise any combination of data packet length, data packet duration, number of data packets in a predetermined time interval, and sequence of data packets. Hence the data can be encoded in one or more of the characteristics of the data packet or data packets.

The data can be encoded in a pulse-density modulation. The data can therefore for example be encoded in a pulse density-modulation using data packet duration, amount of data packets, and/or length of data packets. The data can for example be encoded in an amount of data packets received in a predetermined time interval, e.g., 20, 8, or 0 data packets received for example in a time interval of 100 ms, 50 ms, or 10 ms. The data packets can have a predetermined length resulting in a predetermined duration. Averaging over several time intervals can be used to increase resolution. A longer predetermined time interval allows to lower the energy consumption of the data receiving device, as processing of the received data is only performed after longer predetermined time intervals. The information obtained from the decoded data can for example be stored in the simple logic unit until a beginning of a next time interval. A shorter predetermined time interval, for example shorter than the flicker sensitivity frequency of the human eye allows using information obtained from the decoded data without noticeable delay. The information of the decoded data can for example comprise control data with a command for controlling the operation of the data receiving device. The predetermined time interval can for example have a duration of 10 ms corresponding to a 100 Hz repetition rate, or 8,333 ms, for a 120 Hz repetition rate.

The data can also be encoded in a duration for receiving a predetermined number of data packets at the data receiving device. The predetermined number of data packets divided by the duration can be used to calculate the number of data packets in a predetermined time interval.

In one embodiment the simple logic unit comprises a logic gate, a switch, a comparator, a timer, and/or a counter. The simple logic unit can comprise one of a logic gate, a switch, a comparator, a timer, or a counter. The simple logic unit can also comprise any combination of a logic gate, a switch, a comparator, a timer, and a counter. The simple logic unit can also comprise several logic gates, switches, comparators, timers and/or counters. The counter can for example be configured to count a number of data packets received per time interval. The timer can for example be configured to measure a time interval and to reset the counter after the time interval has lapsed. The simple logic unit can also comprise analogue circuitry or a simple µC. In this case the simple µC can be configured to execute simple logic functions on the encoded data and the respective decoded data. The simple µC is, however, not configured for processing the data stored in the data packet or data packets itself. The simple µC is a low cost and low power consumption µC, i.e., with power consumption below a few mW, such as below 10 mW, below 5 mW, below 2 mW, or below 1 mW.

The data can comprise control data comprising a command for controlling the data receiving device. The control data can for example comprise a command for adjusting the brightness or emitted color of a data receiving device in form of a lighting device with a lamp, a command for turning the data receiving device on or off, or a command for activating or deactivating a predetermined operation mode of the data receiving device, such as a standby mode or a predetermined color cycling mode. Alternatively or additionally the data can comprise sensing data, status data, or configuration data.

The data receiving device can comprise a functional unit. The functional unit can be configured for performing a function based on the decoded control data. The functional unit can for example be a lamp, a light-emitting diode (LED), a sensor, a magnet, an actuator, a fan, a heating unit, a cooling unit, or any other functional unit for performing a function.

In one embodiment the data receiving device comprises an energy storage. The energy storage is configured to supply power to the data receiving device. The energy storage can for example be configured to supply power to the data receiving device during a standby mode or modes in which no power is received via the Ethernet connection. The data receiving device can be configured to perform a standby mode in order to reduce power consumption. The standby mode can for example be automatically activated if no power is transmitted via the Ethernet connection, for example if the power over Ethernet system is turned into a standby mode to reduce power consumption. In the standby mode power consumption and functionality of the data receiving device is reduced. Furthermore the power transmission to the data receiving device via the Ethernet connection can be blocked. In this case the data receiving device is powered by the energy storage alone. Complex circuitry, such as µC and µP with PHY that consume power in the range of several hundreds of mW are unsuitable for operating based on stand alone energy storages. Since the simple logic unit can consume below a few mW, such as below 10 mW, below 5 mW, below 2 mW, or below 1 mW, it can be operated in standby mode by the power supplied by the energy storage alone without the need of power supply via the Ethernet connection. The energy storage can for example be a battery or a capacitor.

The data receiving device can for example be a lighting device, a user interface device, a sensor device, a magnet device, an actuator device, a fan device, a heating device, or a cooling device. The lighting device can for example comprise a lamp, or LED as functional unit. The user interface device can for example comprise a switch panel, a rotary dimmer, or a touch display.

In one embodiment the data receiving device comprises an encoding unit for encoding data in a characteristic of one or more data packets. The data can for example be control data, status data, sensing data, configuration data, or any other data derived or stored in the data receiving device. In case that the data receiving device comprises a sensor, the data can for example be sensing values of the sensor. In case that the data receiving device comprises a user interface, the data can for example be commands issued by a user interacting with the user interface. Therefore the data receiving device can also transmit encoded data via the Ethernet connection.

The data receiving device can comprise a sensor and/or a user interface, i.e., the data receiving device can comprise a sensor, a user interface, or a sensor and a user interface. The sensor and/or user interface can provide local data in form of sensing data or user input data. The sensor can for example be configured for measuring ambient light or temperature. The user interface can for example comprise a touch display, user-operated buttons, switches, potentiometers, or the like that can be used by a user in order to provide user input data. The data receiving device can be configured to perform a function based on the local data, the decoded data or any combination of the local data and the decoded data.

The data receiving device can for example be a lighting device comprising a lamp and a user interface in form of a dimmer potentiometer. The dimmer potentiometer can for example be adjusted to a value of 50% by a user, i.e., only a power consumption corresponding to 50% brightness of the lamp is allowed. In this case if the decoded data comprises a command for setting the brightness to 60% of the maximal brightness due to the local data provided by the dimmer potentiometer, a lower brightness of 50% will be provided.

In a further aspect of the present invention a power over Ethernet system is presented. The system comprises a data receiving device according to any embodiment of the present invention, a power source, a control device, and an Ethernet connection. The power over Ethernet system is configured to provide power from the power source and data encoded in a characteristic of one or more data packets from the control device via the Ethernet connection to the data receiving device.

The power source and the control device can for example be part of a power sourcing equipment (PSE). Since the data is encoded in a characteristic of one or more data packets, the information stored in the data packets, i.e., in the bit patterns, can be dummy information. Alternatively the data and the characteristic of the data packet or data packets can be used in order to transmit information.

In one embodiment the control device is configured to encode data in a characteristic of one or more data packets. Data can therefore be received by the control device, e.g., via Ethernet connection using the Ethernet Protocol. The data, e.g. stored in data packets, can for example be provided to the control device by a server or a building management system (BMS). The control device can then encode the data in a characteristic of one or more data packets and transmit the encoded data to the data receiving device via the Ethernet connection. This corresponds to a translation from one coding scheme, e.g. data encoded in the Ethernet Protocol to another, e.g., data encoded in a characteristic of one or more data packets, in the following called simple data transmission protocol. Alternatively or additionally data encoded in a characteristic of one or more data packets can be received by the control device that forwards the encoded data to the data receiving device. In this case the data can for example be encoded by the BMS or an encoding unit of the PSE.

The system can also comprise two or more data receiving devices according to any embodiment of the present invention. The control device can be configured to control the transmission of the data packets to each of the data receiving devices. The PSE can comprise a number of ports to which data receiving devices can be connected via Ethernet connections. The PSE and the data receiving devices can be connected in a predetermined connection configuration such that the control device is configured to send encoded data to a specific one of the data receiving devices, e.g., by associating one or more specific ports with a MAC address of a data receiving device. In this case the control device decodes data received via Ethernet protocol, determines the MAC address and transmits the data encoded in a characteristic of one or more data packets to the data receiving device that does not require to actually decode the information stored in the data packets, but only the information encoded in the characteristic of the data packet or data packets. The predetermined connection configuration can for example be produced in a configuration step when the data receiving devices and PSE are connected via Ethernet connections.

The control device can be configured to force a transmission of data packets to one or more data receiving devices. In particular the control device can be configured to force transmission of data packets to one or more data receiving devices if the system comprises one or more PSE, switches, or hubs that would normally prevent transmission of data packets if no appropriate data sink is detected.

The control device can be configured to measure a power consumption of the data receiving devices of the system. The control device can also be configured to control the transmission of the data packets to each of the data receiving devices based on the measured power consumption of each of the data receiving devices. The control device can for example be configured to transmit data encoded in the data packet or data packets only to data receiving devices that have a simple logic unit for decoding the encoded data, e.g. indicated by a predetermined power consumption, such as a power consumption below a predetermined threshold, such as below a few mW, for example below 10 mW, below 5 mW, below 2 mW, or below 1 mW. In this case the encoded data can be sent to all of the data receiving devices with predetermined power consumption, to a specific one of the data receiving devices or to a specific group of data receiving devices, comprising two or more data receiving devices. The power consumption can thus be used to identify data receiving devices that have the ability to decode data encoded in a characteristic of one or more data packets.

In one embodiment the control device comprises a simple logic unit for decoding data encoded in a characteristic of one or more data packets. The control device can therefore for example receive encoded data from data receiving devices. Such data can for example be control data, status data, configuration data, or sensing data.

In a further aspect of the present invention a method for communicating with a data receiving device via an Ethernet connection is presented. The data receiving device can be a data receiving device for a power over Ethernet system and the data receiving device can be arranged in a power over Ethernet system. In the method data for communicating with the data receiving device is encoded in a characteristic of one or more data packets.

The characteristic can comprise data packet length, data packet duration, number of data packets in a predetermined time interval, and/or sequence of data packets.

In one embodiment of the method data that is encoded in a characteristic of one or more data packets is transmitted to the data receiving device. This embodiment of the method can comprise the steps:

receiving data, encoding the data in a characteristic of one or more data packets, and transmitting the encoded data to the data receiving device.

The encoding of the data in a characteristic of one or more data packets can for example be performed by a control device, in a PSE, BMS or on a server.

The method can also comprise the steps:

receiving the data encoded in a characteristic of one or more data packets, decoding the encoded data, and performing a function based on the decoded data.

In a further aspect of the present invention a computer program for communicating with a data receiving device via an Ethernet connection is presented. The computer program comprises program code means for causing a simple logic unit to carry out the method as defined in claim 13, when the computer program is run on the simple logic unit.

In other embodiments the computer program can comprise program code means for causing a simple logic unit to carry out the method of any embodiment of the method.

Other embodiments of the computer program can comprise program code means for causing a processor to carry out the method as defined in claim 13 or any embodiment of the method, when the computer program is run on the processor.

It shall be understood that the data receiving device of claim 1, the power over Ethernet system of claim 9, the method of claim 13 and the computer program of claim 15, have similar and/or identical preferred embodiments, in particular, as defined in the dependent claims.

It shall be understood that a preferred embodiment of the present invention can also be any combination of the dependent claims or above embodiments with the respective independent claim.

These and other aspects of the invention will be apparent from and elucidated with reference to the embodiments described hereinafter.

DETAILED DESCRIPTION OF EMBODIMENTS

Figure 1:
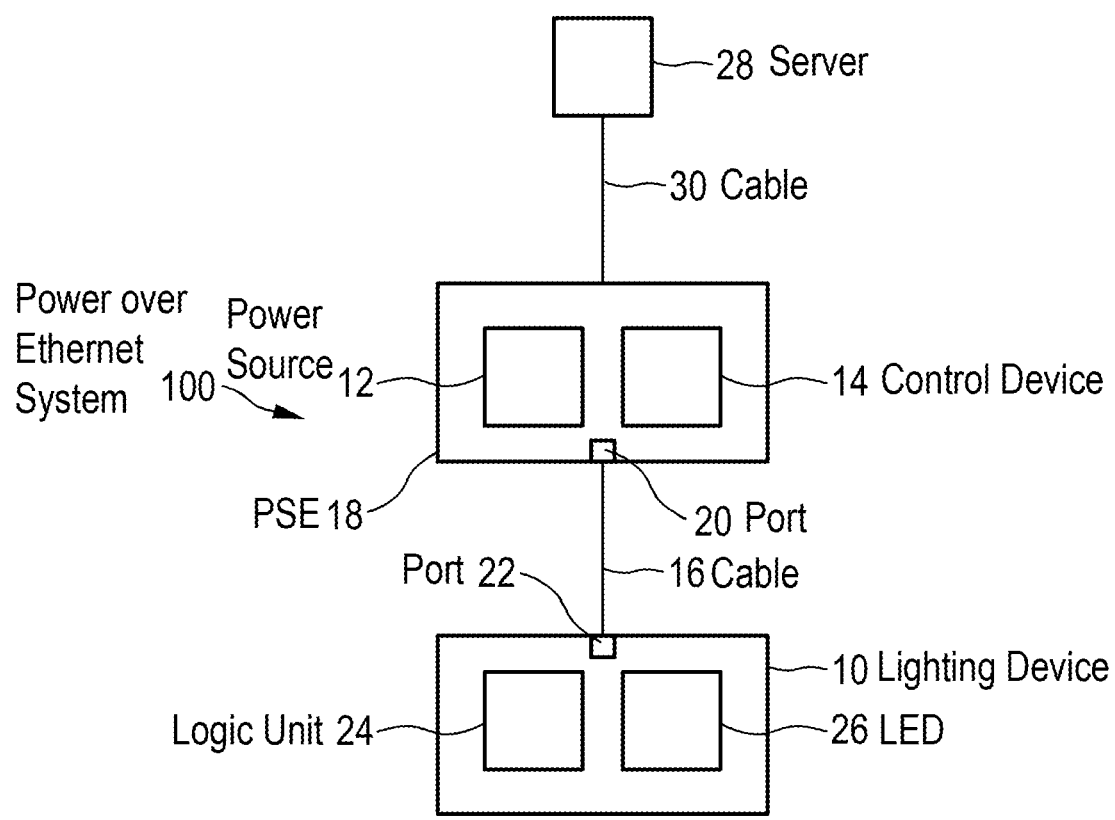
FIG. 1 shows schematically and exemplarily a first embodiment of a power over Ethernet system with a first embodiment of a data receiving device.

FIG. 1 shows schematically and exemplarily a first embodiment of a power over Ethernet system 100 with a first embodiment of a data receiving device in form of a lighting device 10. The system 100 comprises the lighting device 10, a power source 12, a control device 14, and an Ethernet connection in form of a cable 16.

The power source 12 and control device 14 are part of a PSE 18. The PSE 18 comprises a port 20. In another embodiment the PSE 18 comprises several ports.

The lighting device 10 comprises a port 22 for receiving power and data, a first embodiment of a simple logic unit 24, and a functional unit in form of an LED 26. In other embodiments the lighting device 10 can comprise two or more ports.

A server 28 is connected to the PSE 18 via an Ethernet connection in form of cable 30. The server 28 provides data via the cable 30 to the PSE 18 using the Ethernet Protocol. The control device 14 is configured to receive the data and to encode the data in a characteristic of one or more data packets. The characteristic can comprise a number of data packets in a predetermined time interval (see FIG. 6), a data packet length, a data packet duration (see FIG. 7), and/or a sequence of data packets (see FIG. 9). In this embodiment the data is encoded in a pulse-density modulation using a number of data packets in a predetermined time interval.

The PSE 18 is connected to the lighting device 10 via the cable 16. Cable 16 connects ports 20 and 22 and transmits power from the power source 12 and encoded data from the control device 14 to the lighting device 10.

The simple logic unit 24 decodes the data encoded in the characteristic of the data packets. In order to decode the encoded data the simple logic unit 24 comprises logic gates, switches, comparators, timers, and counters.

The data comprises control data generated on or provided to the server 28. The control data comprises a command for controlling the lighting device 10. Hence after the simple logic unit 24 decoded the control data it forwards the command to the LED 26. The LED 26 performs a function based on the command, e.g. it is activated or deactivated.

The system 100 can thus for example be used for remote control. For example in a situation when a user has left his house with the power over Ethernet system 100 he can send control data comprising a command for deactivating the lighting device 10 to the server 28. The control data can for example be send wirelessly via a mobile phone connection from a mobile phone to the server 28. The server 28 will then transmit the command from the server 28 to the PSE 18 via Ethernet Protocol. The control device 14 of the PSE 18 encodes the control data in a characteristic of one or more data packets. This encoded data is then transmitted to the lighting device 10. The system 100 uses a simpler protocol, i.e. the simple data transmission protocol, for the communication to the lighting device 10, such that cost and power consumption is reduced.

Figure 2:
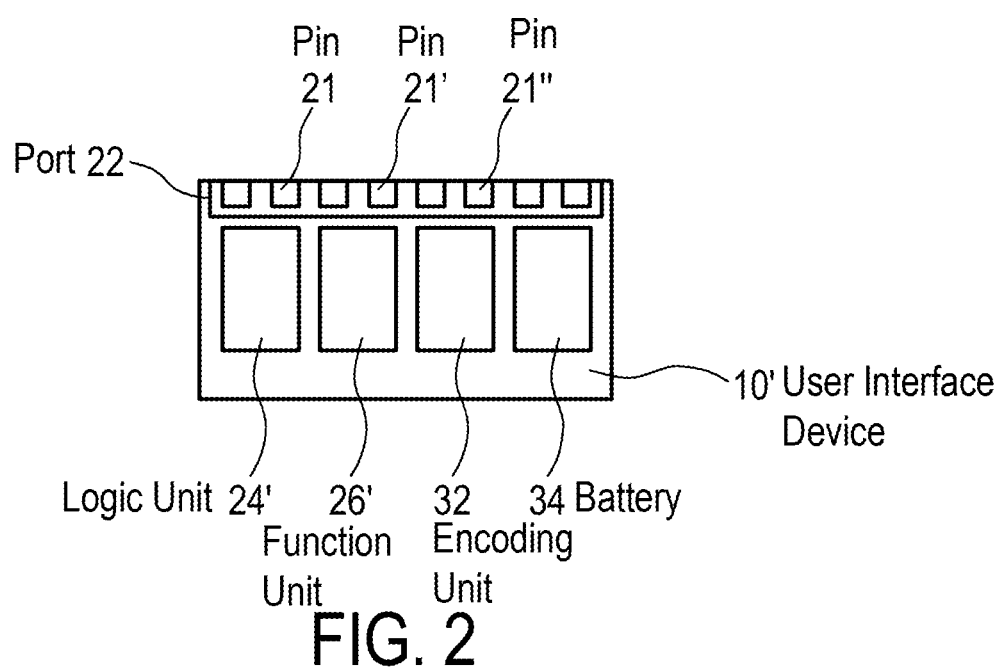
FIG. 2 shows schematically and exemplarily a second embodiment of a data receiving device.

FIG. 2 shows schematically and exemplarily a second embodiment of the data receiving device in form of a user interface device 10'. In other embodiments the data receiving device can also for example be a lighting device, magnet device, an actuator device, a fan device, a heating device, or a cooling device.

The user interface device 10' comprises port 22 comprising pins 21, 21', and 21", a second embodiment of a simple logic unit 24', a function unit in form of a touch display 26', an encoding unit 32, and an energy storage in form of a battery 34. The energy storage can alternatively for example be a capacitor.

The port 22 receives power and data via its pins 21, 21', and 21". In this embodiment pin 21 can receive power and data, pin 21' can receive power and pin 21" can receive data. Therefore for example an Ethernet connection in form of a cable can be connected to the port 22.

The simple logic unit 24' can decode data encoded in a characteristic of one or more data packets.

The touch display 26' can be used by a user for interacting with the user interface device 10'. The user can use the touch display 26' for generating control data comprising a command, such as a command for activating or deactivating another data receiving device of a power over Ethernet system if the user interface device 10' is connected to a power over Ethernet system comprising several data receiving devices (see FIG. 3). The touch display 26' furthermore allows displaying status data of the user interface device 10', as well as of other data receiving devices and the power over Ethernet system if the user interface device 10' is connected to the power over Ethernet system.

The encoding unit 32 encodes the control data in a characteristic of one or more data packets generated by the touch display 26'. The encoding unit 32 can for example encode control data in form of a command for activating or deactivating a lighting device 10. The encoded data is then transmitted to the control device 14' of the system 100' which forwards the encoded control data to the lighting devices 10 in order to activate or deactivate them (see FIG. 3). The touch display 26' can thus be used as a simple switch for turning on or off lighting devices 10.

The battery 34 supplies power to the user interface device 10' if no power is received via Ethernet connection. In particular in a standby mode of the power over Ethernet system the user interface device 10' can be powered by the battery 34. Since the simple logic unit 24' consumes below a few mW, such as below 10 mW, below 5 mW, below 2 mW, or below 1 mW, it can be operated in standby mode by the power supplied by the battery 34 alone without the need of power supply via the Ethernet connection. This allows transmitting data via the simple data transmission protocol to the user interface device 10' even if the power over Ethernet system is in standby mode.

In another embodiment the data receiving device comprises a memory in form of sample and hold stages in order to temporarily store received data (not shown). Alternatively the data receiving device may also comprise any other kind of memory.

Figure 3:
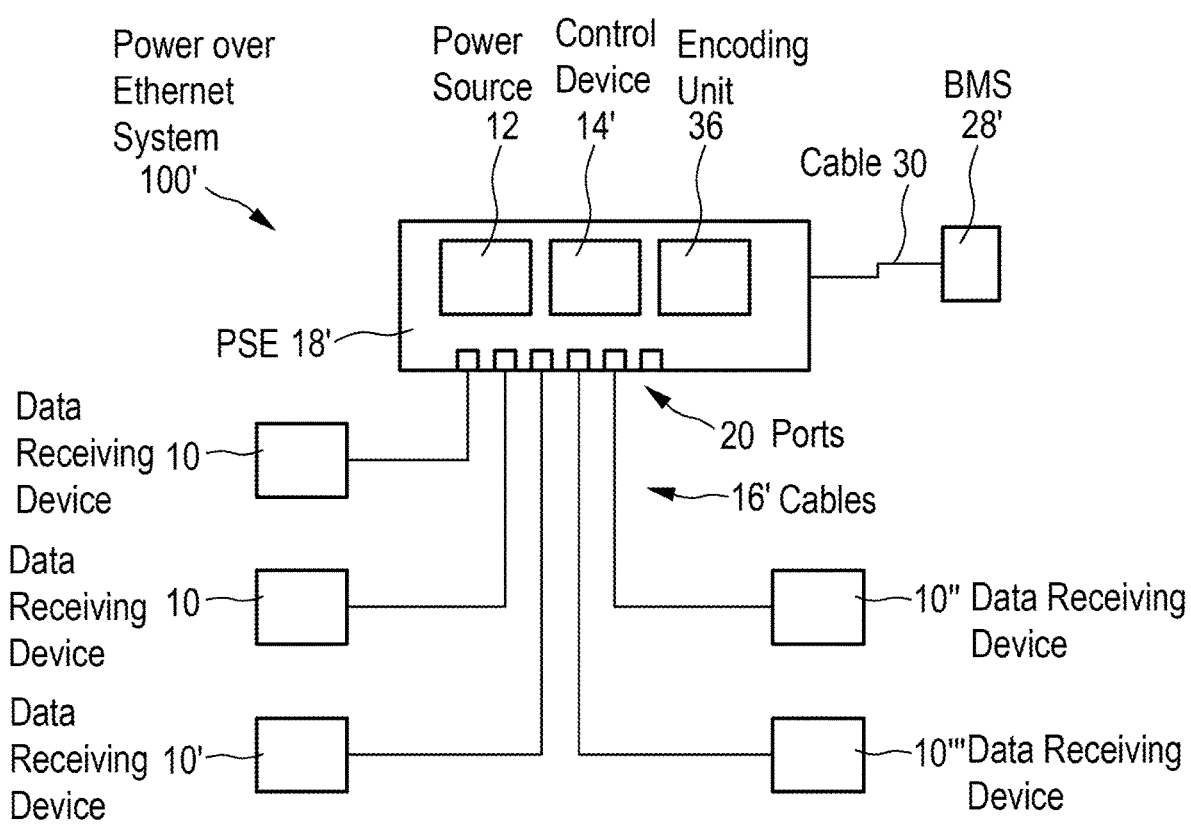
FIG. 3 shows schematically and exemplarily a second embodiment of a power over Ethernet system with several data receiving devices.

FIG. 3 shows schematically and exemplarily a second embodiment of a power over Ethernet system 100' with two data receiving devices in form of lighting devices 10, a data receiving device in form of a user interface device 10', a data receiving device in form of a sensor device 10", and a data receiving device in form of a heating device 10'''. In another embodiment the power over Ethernet system may also comprise a different number of data receiving devices or other types of data receiving devices, such as lighting devices, magnet devices, actuator devices, fan devices, heating devices, or cooling devices.

The system 100' furthermore comprises a PSE 18' with a power source 12, a control device 14', an encoding unit 36, and several ports 20. The PSE 18' is connected to the data receiving devices 10, 10', 10", and 10''' via cables 16'. The PSE 18' is furthermore connected to BMS 28' via cable 30.

The power source 12 supplies power, the control device 14' in this embodiment decodes encoded data, such as data encoded using the Ethernet protocol and data encoded in a characteristic of one or more data packets, and controls the transmission of data packets and the encoding unit 36 encodes data in a characteristic of one or more data packets. The control device 14' can force the transmission of the data packets to each of the data receiving devices.

The system 100' has various operation modes. In a first operation mode data is transmitted via cable 30 from BMS 28' to the PSE 18' using the Ethernet protocol. The data is received by the control device 14' which decodes the data from the Ethernet protocol in order to identify the destination of the data packet and to identify the data stored in the data packet. The control device 14' then transmits the data to the encoding unit 36 for encoding the data in a characteristic of one or more data packets. The encoding unit 36 then transmits the encoded data back to the control device 14' which transmits the encoded data to one or more of the data receiving devices based on the identified destination of the data packet. Therefore each of the ports 20 is associated with a MAC address of one of the connected data receiving devices. The data can for example be a command to activate or deactivate one or more of the data receiving devices.

In a second operation mode data encoded in a characteristic of one or more data packets can be received from any of the data receiving devices at the PSE 18'. The data can for example be status data, configuration data, or control data. The control device 14' can decode the encoded data and transmit the data to the BMS 28' via cable 30 using the Ethernet protocol. Alternatively the control device 14' can forward the encoded data to another data receiving device, e.g., in case that the user interface device 10' transmits control data the control data can be transmitted to the lighting devices 10 in order to activate or deactivate their LEDs. The destination of the data can also be encoded in a characteristic of one or more data packets. As the system 100' only comprises a small number of devices, only a small amount of data is needed for uniquely identifying each of the devices of the system 100'. Hence the destination can be easily encoded in a characteristic of one or more data packets.

In a third operation mode the control device 14' measures a power consumption of the data receiving devices. The control device 14' can control the transmission of the data packets to each of the data receiving devices based on the measured power consumption of each of the data receiving devices. The control device 14' can for example transmit data encoded in a characteristic of one or more data packets only to specific data receiving devices indicated by a predetermined power consumption, such as a power consumption below a predetermined threshold, e.g. below a few mW, such as below 10 mW, below 5 mW, below 2 mW, or below 1 mW. Measuring the power consumption and determining whether it is below the predetermined threshold therefore allows the control device 14' for example to determine whether the connected data receiving device comprise a simple logic unit that can decode encoded data. In this case the encoded data can be sent to all of the data receiving devices with predetermined power consumption, to a specific one of the data receiving devices or to a specific group of data receiving devices, comprising two or more data receiving devices.

In another embodiment the control device 14' can comprise the encoding unit 36. Such a control device corresponds to the control device 14 described in FIG. 1.

Figure 4:
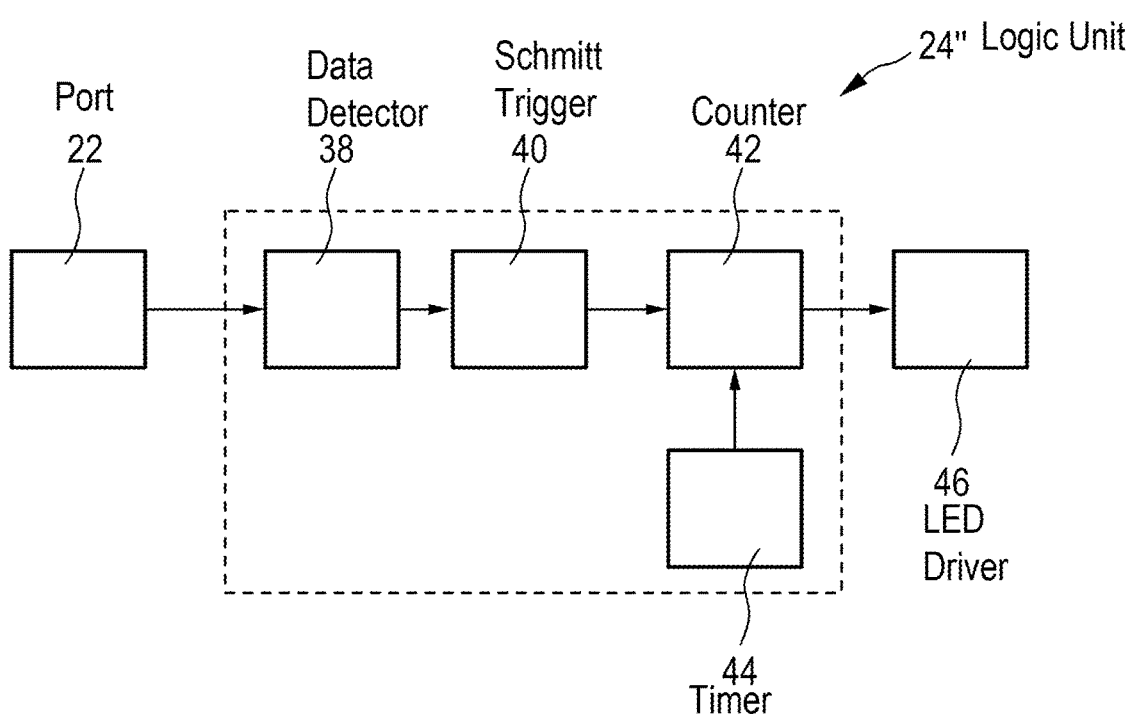
FIG. 4 shows schematically and exemplarily a third embodiment of a simple logic unit.

FIG. 4 shows schematically and exemplarily a third embodiment of a simple logic unit 24". The simple logic unit 24" comprises a RX data detector 38, a comparator in form of a Schmitt trigger 40, a counter 42, and a timer 44. The simple logic unit 24" is connected to port 22 for receiving data and to an LED driver 46.

A voltage signal is received at port 22 which forwards the voltage to RX data detector 38. The voltage is detected at the RX data detector 38. The Schmitt trigger 40 compares the measured voltage to a reference voltage close to a default level of the line, which in this embodiment is 0 V. Hence the Schmitt trigger 40 can detect data packets and forward the rising edge at the start of each data packet to the counter 42. The counter 42 increases by one for each data packet it receives. The timer 44 measures time intervals and resets the counter 42 in predetermined time intervals. The counter 42 transmits the number of data packets counted in a time interval to the LED driver 46. The LED driver 46 operates an LED according to the received data, i.e., the number supplied from the counter 42. The number can for example be used to adjust to a specific brightness level or to activate or deactivate the LED.

In an alternative embodiment the simple logic unit 24" can be integrated in a simple μC that runs a program code to capture and count the data packets while resetting the counting in predetermined time intervals. The simple μC is a low cost and low power consumption μC. The simple μC can then provide a control parameter generated from the counting of the data packets to the LED driver 46. The simple μC does not process the data in the data packets itself but only the data encoded in the characteristic of the data packet or data packets.

In an alternative embodiment of the simple logic unit (not shown) instead of encoding data in a number of data packets received in a predetermined interval, the data can for example also be encoded in a duration for receiving a predetermined number of data packets. In such an embodiment of the simple logic unit the counter resets the timer after receiving a predetermined number of data packets, e.g., 20, 10, 5, 2, or 1 (not shown). This allows to determine the duration for receiving a predetermined number of data packets from which a number of data packets received in a predetermined interval can be calculated.

Figure 5:
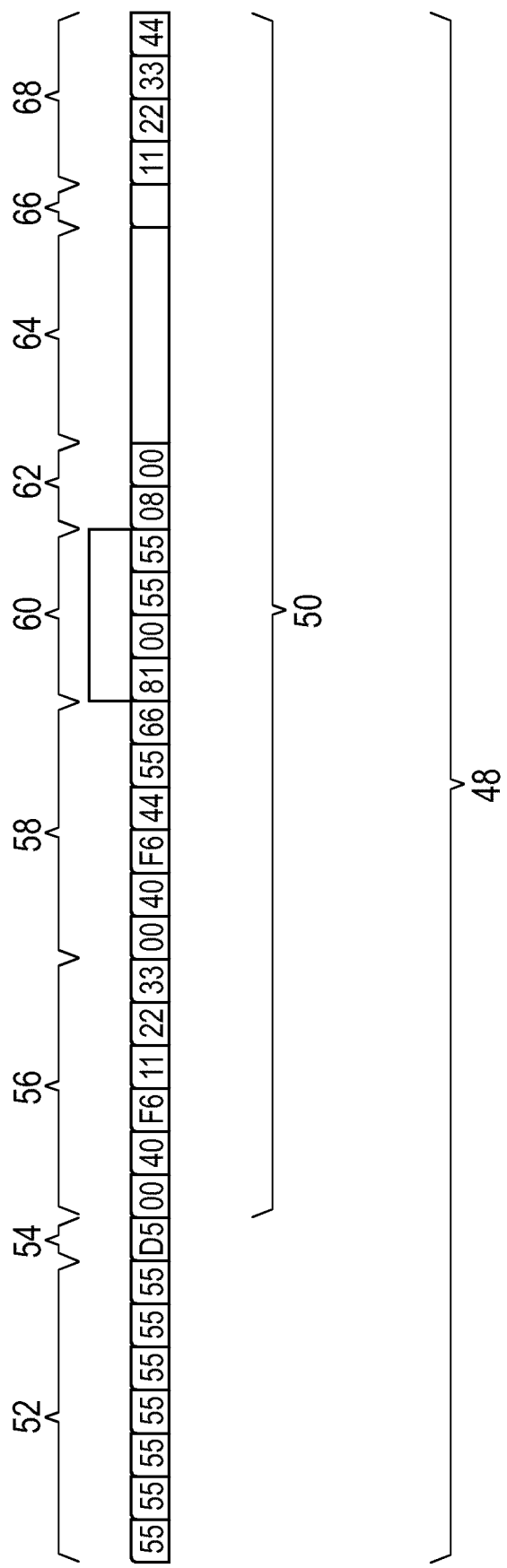
FIG. 5 shows diagrammatically and exemplarily a structure of an Ethernet data packet.

FIG. 5 shows diagrammatically and exemplarily a structure of an Ethernet data packet 48. The data packet 48 comprises an Ethernet frame 50 that is used to store information for data transmission using the Ethernet protocol. The data packet 48 has a preamble 52, a start frame delimiter (SFD) 54, a destination MAC address 56, a source MAC address 58, an optional virtual local area network (VLAN) tag 60, an Ethertype 62, data stored as payload 64, a data fill field 66, and a frame check sequence (FCS) 68.

The preamble consists of a 56-bit pattern of alternating 1 and 0 bits providing bit-level synchronization to allow devices connected via Ethernet connection to synchronize. The SFD 54 marks a new incoming frame 50.

The destination MAC address 56 is a unique address of a device that is meant to receive the data packet 48. The source MAC address 58 is a unique address of a device which is the source of the data packet 48. The MAC addresses provided in the figure are only exemplary. Any other MAC addresses can be source and destination address.

The VLAN tag 60 defines the data packet 48 to be processed according to the standard IEEE 802.1Q, i.e., handling of the data packet 48, e.g., by bridges and switches. The VLAN tag 60 is optional.

The Ethertype 62 either defines the size of the payload 64 of the data packet 48 or it indicates that the data packet 48 is used as an Ethertype to indicate which protocol is encapsulated in the payload 62 of the data packet 48. The numbers for the Ethertype 62 are only exemplary.

The payload 64 comprises the information to be transmitted from the source to the destination, e.g., data such as control data comprising a command. Part or the whole of the payload 64 can also be filled with dummy data, e.g. randomly generated numbers.

The data fill field 66 is used in order to add dummy data if the length of the data packet is below a minimal length.

The FCS 68 is used in order to determine whether data transmitted in the data packet 48 is corrupted. The numbers for the FCS are only exemplary.

In contrast to the simple data transmission protocol according to the invention the Ethernet protocol requires decoding the Ethernet data packet which inter alia requires decoding the MAC. This requires complex μC or μP. The simple data transmission protocol can be performed by simple logic units.

FIGS. 6, 7A, 7B and 9 show three different options for encoding data in characteristics of one or more data packets according to the simple data transmission protocol.

Figure 6:
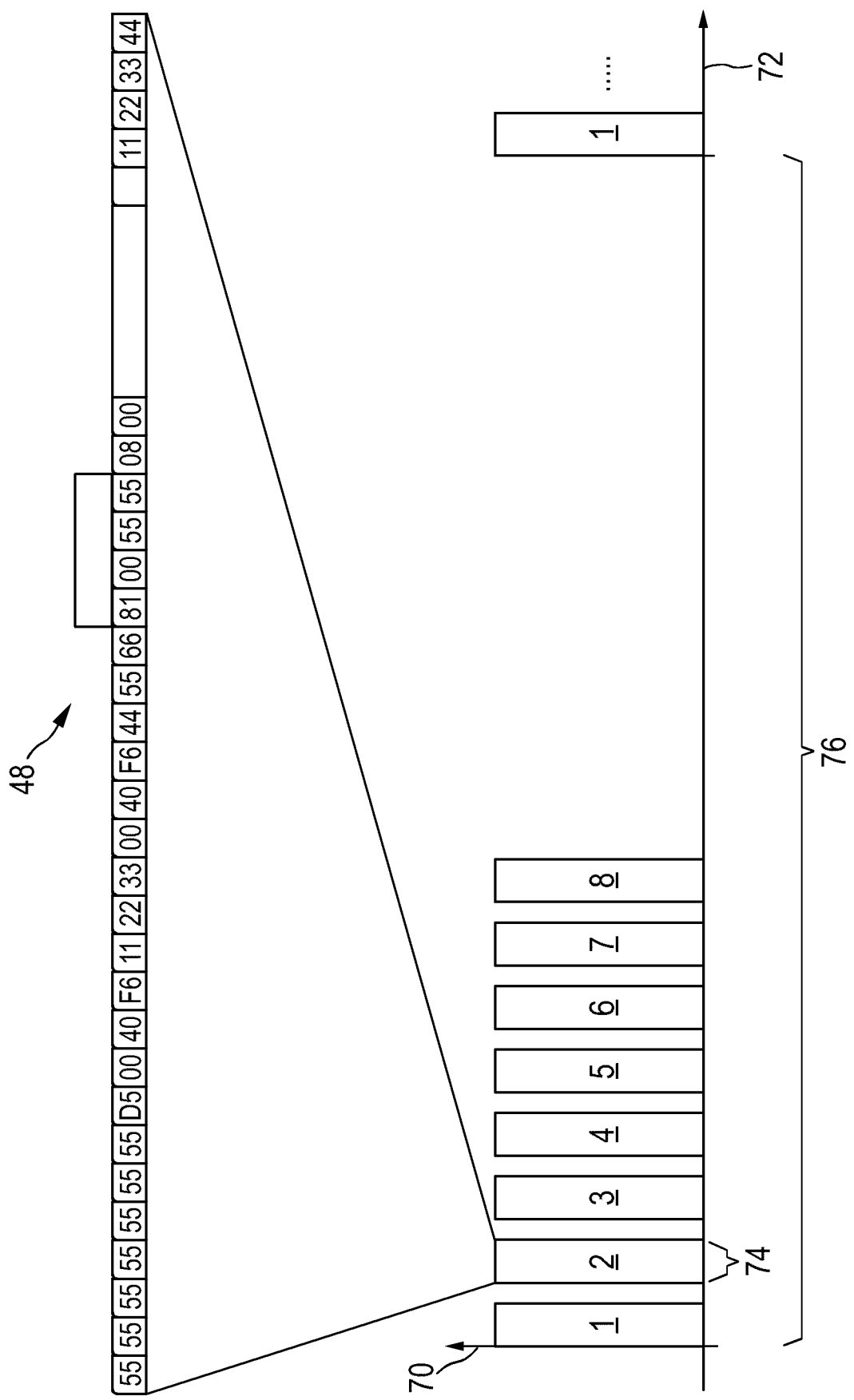
FIG. 6 shows encoded data in a number of data packets.

FIG. 6 shows encoded data in a number of data packets 48. The graph shows data 70 in form of a differential voltage on the vertical axis and time 72 on the horizontal axis. The Ethernet standards define a minimal and maximal data packet length, which including the preamble ranges typically between 72 to 1526 byte. Considering a predetermined network speed the length translates into a predetermined duration 74 of the data packet 48.

This embodiment regards encoded control data for controlling the brightness of a lamp of a lighting device. The data shown in the graph is encoded in data packets 48 with predetermined duration 74. The data packets 48 are counted by a counter, which is periodically reset by a timer in time intervals 76. Hence the counter counts 8 data packets per time interval 76. The time interval 76 is 100 ms in this embodiment, but can also be any other reasonable time interval, such as 8 ms, 10 ms, 25 ms, 50 ms, 200 ms, or longer time intervals. In this embodiment 20 data packets in 100 ms correspond to a brightness value of 100% while 0 data packets correspond to a brightness value of 0% and each data packet corresponds to a brightness adjustment of 5%, such that 8 data packets correspond to a brightness of 40%.

In another embodiment the number of received data packets 48 per time interval 76 can be averaged for several time intervals 76 in order to improve the resolution. Alternatively the resolution can be improved by increasing the number of data packets 48 per time interval 76.

In this embodiment the data packets 48 comprise only dummy data. Alternatively the data packets 48 can also comprise information in form of data stored in the payload of the data packets 48. This information contained in the data packets 48 is, however, not processed by the simple logic unit of the lighting device, but can for example be processed by the control device of the power over Ethernet system.

Figure 7A:
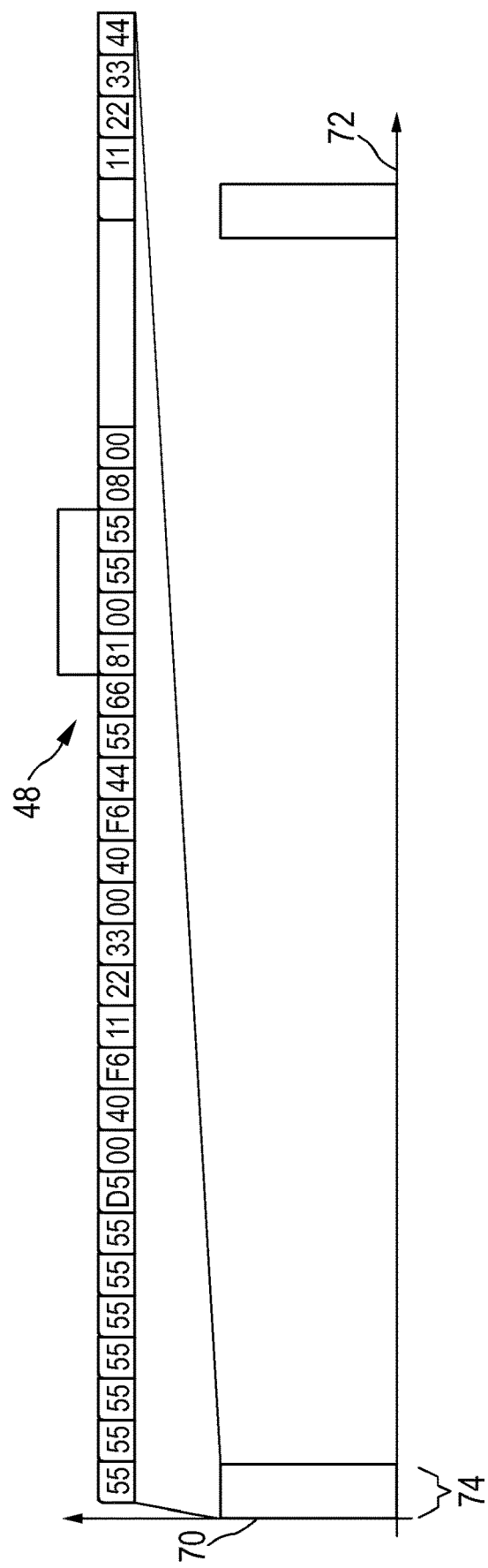
FIGS. 7A and 7B show encoded data in durations of data packets.
Figure 7B:
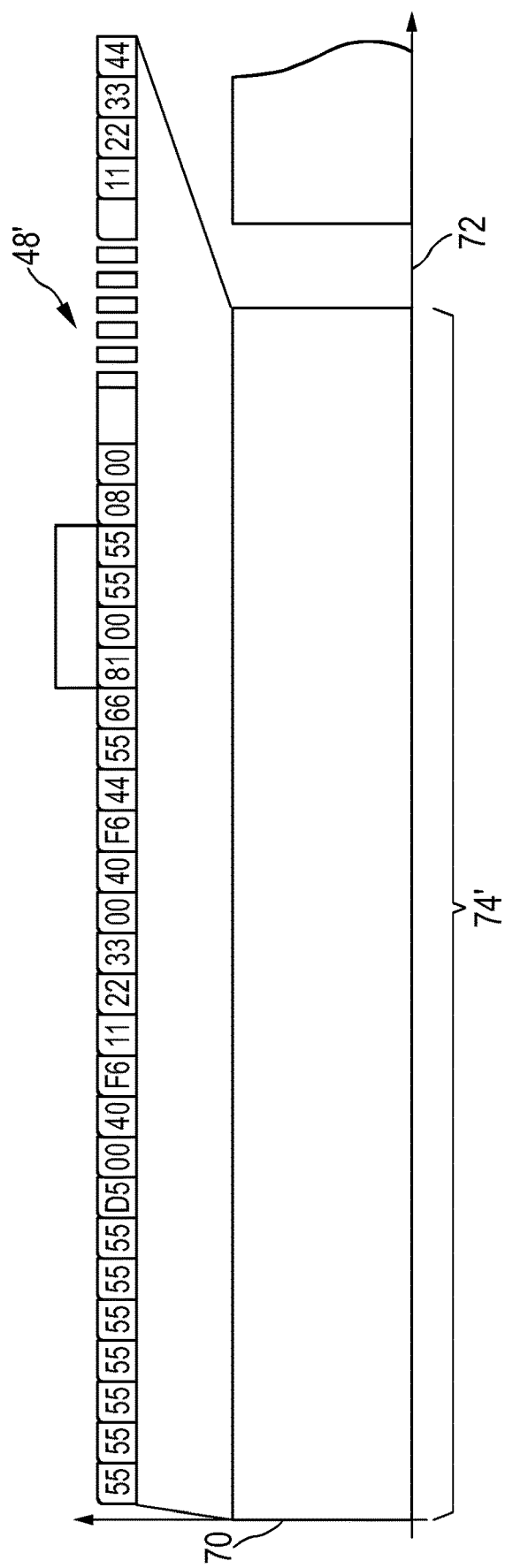

FIGS. 7A and 7B show encoded data in durations 74 and 74' of data packets 48 and 48'. The graph shows data 70 in form of a differential voltage on the vertical axis and time 72 on the horizontal axis. The duration 74 of the data packet 48 is different to the duration 74' of the data packet 48'. Therefore data can be encoded in the duration of the data packets 48 and 48'. In FIG. 7A a data packet 48 with short duration 74 is shown. FIG. 7B shows a data packet 48' with long duration 74'. The duration 74 and 74' can for example be associated with a brightness of a lighting device, such that shorter duration leads to lower brightness and longer duration leads to higher brightness. The duration of the data packet can also be associated to any other data, such as control data, status data, or configuration data.

The embodiments of encoding the data in FIGS. 6 and 7A, 7B can also be combined, i.e., a number of data packets with varying length can be used for encoding the data. In this case more information, such as for example two control parameters like brightness and color temperature can be encoded in the characteristics of the data packets. The encoded data can also for example be used to control a standby mode.

Figure 8:
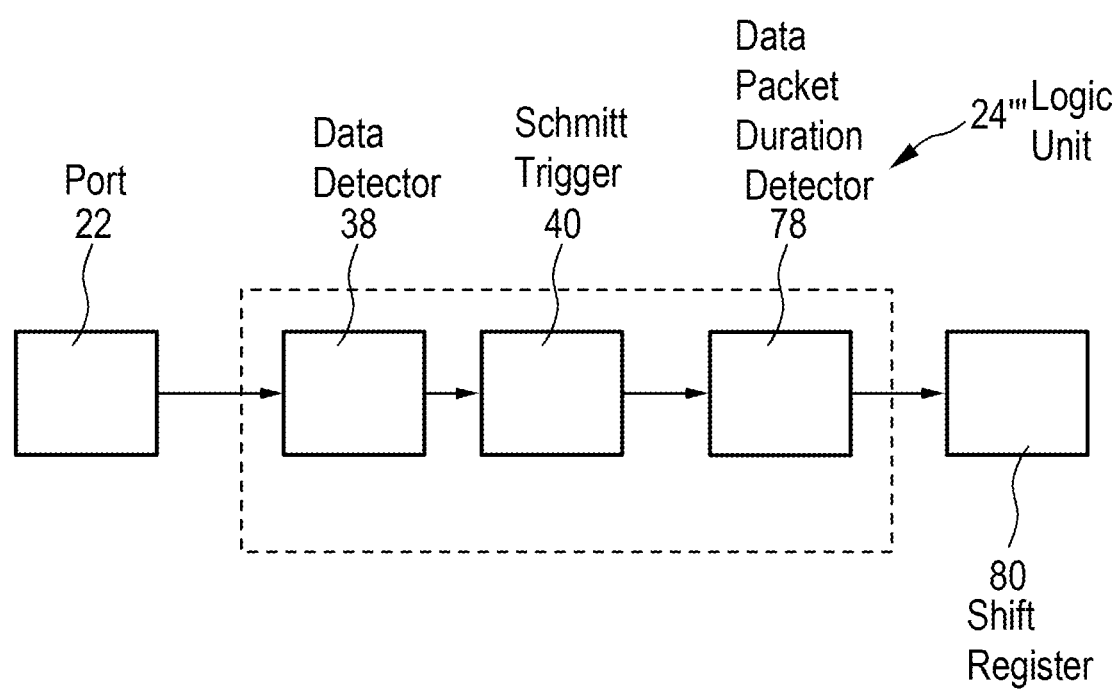
FIG. 8 shows schematically and exemplarily a fourth embodiment of a simple logic unit.

FIG. 8 shows schematically and exemplarily a fourth embodiment of a simple logic unit 24'''. The simple logic unit 24''' comprises an RX data detector 38, a comparator in form of a Schmitt trigger 40, and a data packet duration detector 78. The simple logic unit 24''' is connected to port 22 for receiving data and to a shift register 80.

A voltage signal is received at port 22 which forwards the voltage to RX data detector 38. The voltage is detected at the RX data detector 38. The Schmitt trigger 40 compares the measured voltage to a reference voltage close to a default level of the line, which in this embodiment is 0 V. Hence the Schmitt trigger 40 can detect data packets and forward the data packet to the data packet duration detector 78. The data packet duration detector 78 measures the duration of each of the received data packets. In this embodiment the data packet duration detector 78 only measures whether the data packet has a long or a short duration, i.e., whether the duration is above or below a predetermined threshold duration value, i.e., the data packet duration detector 78 detects a short or long duration of the data packet. Each data packet with duration above the threshold value is associated with a 1, while each data packet with duration below the threshold value is associated with a 0 (see FIG. 9). The 1 and 0 values are forwarded to a shift register 80 in order to generated a digital data stream that can be used to control the data receiving device in which the simple logic unit 24''' is integrated.

In an alternative embodiment the simple logic unit 24''' can be integrated in a simple μC that runs a program code to decode the data encoded in the duration of the data packets. The simple μC is a low cost and low power consumption μC.

Figure 9:
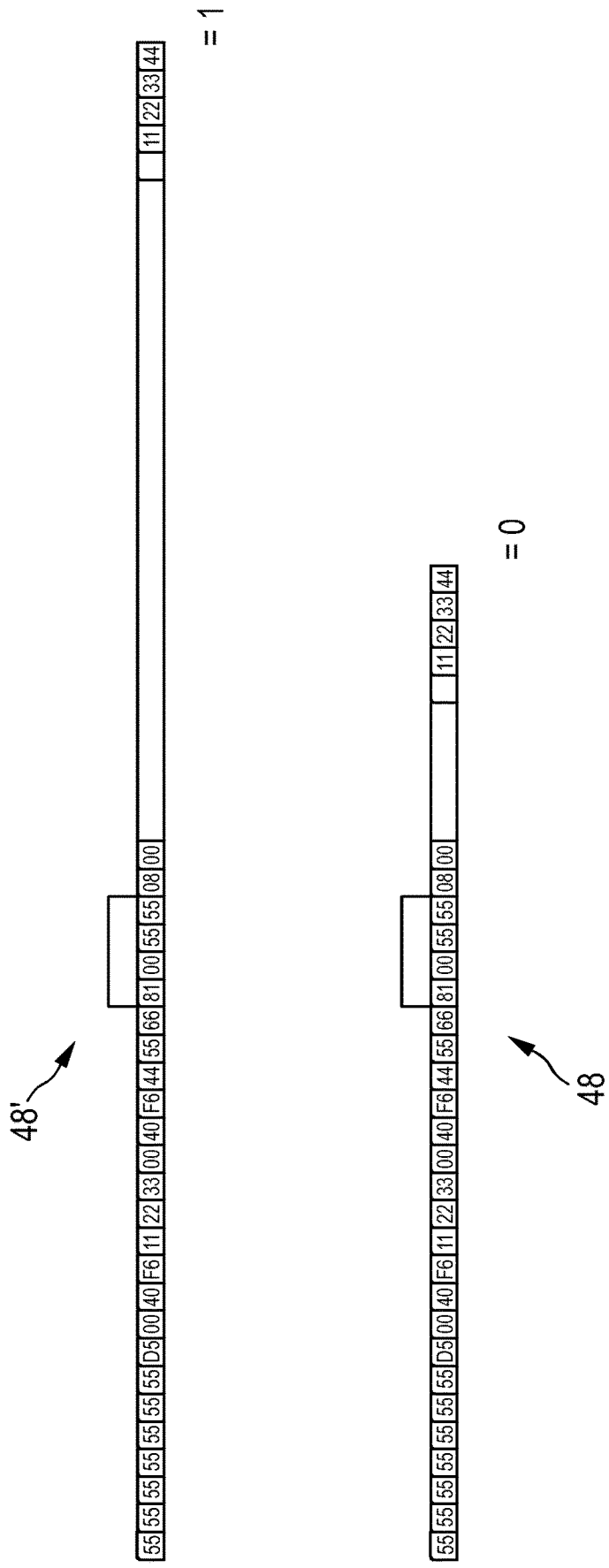
FIG. 9 shows encoded data as bits in dependence of the duration of a data packet.

The simple μC can then use the digital data stream in order to control the data receiving device. FIG. 9 shows encoded data as bits in dependence of the duration of a data packet. Long duration packets 48' and short duration packets 48 can be send in sequence using the simple data transmission protocol. The long duration data packet 48' is associated with the bit value 1 and the short duration data packet 48 is associated with the bit value 0. This allows digitizing the sequence of long and short duration data packets 48' and 48 into bits in order to allow digital control with the simple data transmission protocol.

Figure 10:
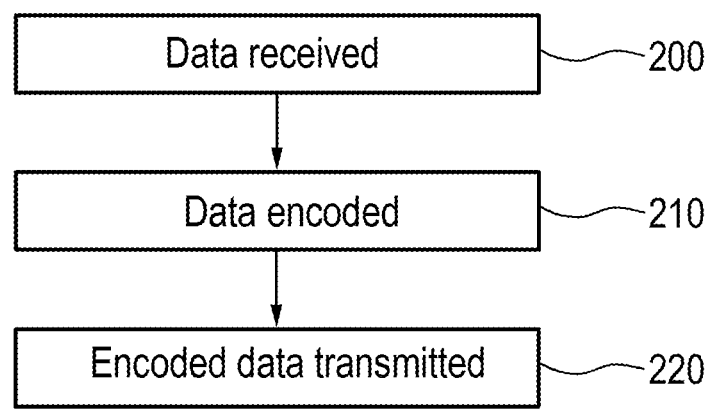
FIG. 10 shows a first embodiment of a method for communicating with a data receiving device via an Ethernet connection using a simple data transmission protocol.

FIG. 10 shows a first embodiment of a method for communicating with a data receiving device via an Ethernet connection using a simple data transmission protocol. Data for communicating with the data receiving device is encoded in a characteristic of one or more data packets. In step 200 data is received via the Ethernet protocol. In step 210 the data is encoded in a characteristic of the data packet or the data packets. The encoded data is then transmitted to the data receiving device in step 220. Step 210 is in this embodiment performed by an encoding unit. Step 210 can for example be performed by an encoding unit of a PSE.

Figure 11:
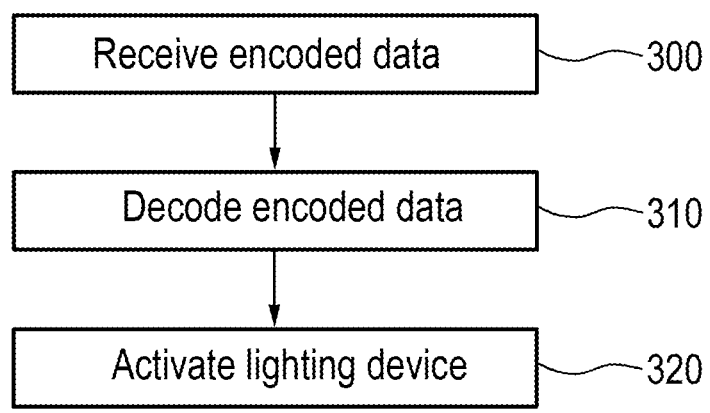
FIG. 11 shows a second embodiment of a method for communicating with a data receiving device via an Ethernet connection using the simple data transmission protocol.

FIG. 11 shows a second embodiment of a method for communicating with a data receiving device in form of a lighting device via an Ethernet connection using a simple data transmission protocol. Data for communicating with the data receiving device is encoded in a characteristic of one or more data packets. In a step 300 data encoded in the characteristic of one or more data packets is received. In this embodiment the data is control data that comprises a command for activating the lighting device. In step 310 the encoded data is decoded. In step 320 the lighting device is activated based on the command included in the decoded data. Alternatively any other function can be performed by the data receiving device based on the decoded data in step 320, e.g., deactivating the lighting device or adjusting the brightness of a lamp of the lighting device based on the decoded data.

The embodiments of the method can be contained in a computer program comprising program code means. The program code means can cause a simple logic unit to carry out the embodiment of the method when the computer program is run on the simple logic unit. Alternative embodiments of the method can be contained in a computer program comprising program code means that can cause a processor to carry out the alternative embodiments of the method when the computer program is run on the processor.

While the invention has been illustrated and described in detail in the drawings and foregoing description, such illustration and description are to be considered illustrative or exemplary and not restrictive; the invention is not limited to the disclosed embodiments. For example, it is possible to operate the invention in an embodiment wherein the data receiving device comprises a sensor and/or a user interface that can provide local data in form of sensing data or user input data. The sensor can for example be configured for measuring ambient light or temperature. The user interface can for example comprise a touch display, user-operated buttons, switches, potentiometers or the like that can be used by a user in order to provide user input data. The data receiving device can be configured to perform a function based on the local data or in dependence of the local data and the decoded data.

Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality.

A single unit, processor, or device may fulfill the functions of several items recited in the claims. The mere fact that certain measures are recited in mutually different dependent claims does not indicate that a combination of these measures cannot be used to advantage.

Operations like receiving data, transmitting data, receiving encoded data, transmitting encoded data, encoding data, decoding data, performing a function based on the decoded data, et cetera performed by one or several units or devices can be performed by any other number of units or devices. These operations and/or the control of the data receiving device, control device, power source, BMS, or power over Ethernet system can be implemented as program code means of a computer program and/or as dedicated hardware.

A computer program may be stored/distributed on a suitable medium, such as an optical storage medium, or a solid-state medium, supplied together with or as part of other hardware, but may also be distributed in other forms, such as via the Internet, Ethernet, or other wired or wireless telecommunication systems.

Any reference signs in the claims should not be construed as limiting the scope.

In summary, the present invention relates to a simple data transmission protocol and a data receiving device for a power over Ethernet system using the simple data transmission protocol. The data receiving device comprises a port and a simple logic unit. The port is configured for receiving power and data transmitted to the data receiving device via an Ethernet connection. The simple logic unit is configured to decode data encoded in a characteristic of one or more data packets received at the port. The data can be encoded in data packet length, data packet duration, number of data packets in a predetermined interval, and/or sequence of data packets. The simple data transmission protocol can reduce power consumption as in contrast to the Ethernet protocol MAC and data stored in the payload of the data packets do not need to be decoded for information transfer. Hence only simple logic functions—operating at frequencies lower than the data rate of the Ethernet connection—are required.

The invention claimed is:

1. A data receiving device for a power over Ethernet system, the data receiving device comprising:
 a port for receiving power and data transmitted to the data receiving device via an Ethernet connection, and
 a simple logic circuit configured to decode the data encoded using a characteristic of data packets received at the port,
 wherein the characteristic used to encode the data comprises a data packet length, data packet duration, number of data packets in a predetermined time interval, and sequence of data packets, wherein the data is encoded in a form of a command for controlling the data receiving device, and wherein the data is encoded in a pulse-density modulation.

2. The data receiving device according to claim 1, wherein the simple logic circuit comprises a logic gate, a switch, a comparator, a timer, or a counter.

3. The data receiving device according to claim 1, wherein the data comprises control data comprising the command for controlling the data receiving device.

4. The data receiving device according to claim 3, comprising a functional circuit configured for performing a function based on the control data.

5. The data receiving device according to claim 1, wherein the data receiving device comprises an energy storage.

6. The data receiving device according to claim 1, wherein the data receiving device is a lighting device, a user interface device, a sensor device, a magnet device, an actuator device, a fan device, a heating device, or a cooling device.

7. A power over Ethernet system comprising:
a data receiving device according to claim 1,
a power source,
a controller, and
an Ethernet connection, wherein the power over Ethernet system is configured to provide power from the power source and data encoded in the characteristic of data packets from the controller via the Ethernet connection to the data receiving device, wherein the characteristic comprises the data packet length, data packet duration, number of data packets in the predetermined time interval, and sequence of data packets.

8. The system according to claim 7, wherein the controller is configured to encode data in the characteristic of the data packets.

9. The system according to claim 7, comprising two or more data receiving devices, wherein the controller is configured to control transmission of the data packets to each of the data receiving devices.

10. The system according to claim 9, wherein the controller is configured to measure a power consumption of the data receiving devices of the system and wherein the controller is configured to control the transmission of the data packets to each of the data receiving devices based on the measured power consumption of each of the data receiving devices.

11. A method for communicating with a data receiving device via an Ethernet connection, wherein the data receiving device comprises a port for receiving power and data transmitted to the data receiving device via the Ethernet connection, and a simple logic circuit configured to decode the data encoded using a characteristic of data packets received at the port, and
wherein the data for communicating with the data receiving device is encoded using a characteristic of the data packets; wherein the characteristic used to encode the data comprises a data packet length, data packet duration, number of data packets in a predetermined time interval, and sequence of data packets, and wherein the data is encoded in a form of a command for controlling the data receiving device, and wherein the data is encoded in a pulse-density modulation.

12. The method according to claim 11, further comprising:
receiving the data encoded in the characteristic of the data packets,
decoding the encoded data, and
performing a function based on the decoded data.

13. A non-transitory computer readable medium storing instructions that when executed by a processor cause the processor to perform the method of claim 11.

* * * * *